United States Patent
Mueller et al.

(10) Patent No.: US 7,080,281 B2
(45) Date of Patent: Jul. 18, 2006

(54) METHOD AND CIRCUIT ARRANGEMENT FOR MONITORING THE OPERATION OF A PROCESSOR

(75) Inventors: Axel Mueller, Regensburg (DE); Uwe Zimmerman, Lichtenstein Ot Roedlitz (DE)

(73) Assignee: Siemens Aktiengesellschaft, Munich (DE)

( * ) Notice: Subject to any disclaimer, the term of this patent is extended or adjusted under 35 U.S.C. 154(b) by 624 days.

(21) Appl. No.: 10/355,525

(22) Filed: Jan. 31, 2003

(65) Prior Publication Data

US 2003/0149868 A1    Aug. 7, 2003

(30) Foreign Application Priority Data

Jan. 31, 2002    (DE) ................ 102 03 807

(51) Int. Cl.
*G06F 11/00*    (2006.01)
(52) U.S. Cl. .......................... 714/23; 714/55
(58) Field of Classification Search ............. 714/23, 714/55, 30; 307/42; 713/1
See application file for complete search history.

(56) References Cited

U.S. PATENT DOCUMENTS

| | | | | |
|---|---|---|---|---|
| 4,654,821 A | * | 3/1987 | Lapp ........................ | 713/330 |
| 5,123,018 A | * | 6/1992 | Peterson ................... | 714/55 |
| 5,426,776 A | * | 6/1995 | Erdman .................... | 714/55 |
| 6,134,655 A | * | 10/2000 | Davis ....................... | 713/1 |
| 6,948,103 B1 | * | 9/2005 | Indo ......................... | 714/51 |
| 6,961,866 B1 | * | 11/2005 | Janin et al. ............... | 714/3 |
| 2002/0104048 A1 | * | 8/2002 | Frank et al. .............. | 714/55 |
| 2002/0124212 A1 | * | 9/2002 | Nitschke et al. .......... | 714/55 |
| 2003/0079163 A1 | * | 4/2003 | Hashimoto et al. ....... | 714/55 |
| 2004/0153886 A1 | * | 8/2004 | Schumacher et al. .... | 714/55 |

FOREIGN PATENT DOCUMENTS

| | | |
|---|---|---|
| DE | 33 42 209 A1 | 5/1985 |
| DE | 32 43 760 C2 | 6/1986 |
| DE | 43 29 872 C2 | 1/1998 |

OTHER PUBLICATIONS

MC14060B 14-Bit Binary Counter and Oscillator; Motorola, Inc., 1995.

* cited by examiner

*Primary Examiner*—Dieu-Minh Le
(74) *Attorney, Agent, or Firm*—Baker Botts L.L.P.

(57) ABSTRACT

A counter (2) alters its counter variable (C) on the basis of a clock signal which is generated by an oscillator (3). If the reset signal ($CT_1$) intermittently transmitted by the processor (1) during normal operation is absent, the count variable (C) reaches a first limit value ($C_{gr1}$). The counter (2) then sends an interrupt signal (IR) to the processor (1). If the reset signal (CT) continues to be absent and the count variable (C) reaches a second limit value ($C_{gr2}$), the counter (2) transmits a hardware reset signal (HWR) to the processor (1). This signal or the result of this signal (HWR) is also used to reset the counter (2), i.e. the count variable (C) is set to a predetermined start value ($C_{START}$). Thus, in the absence of the reset signal ($CT_1$) from the processor (1), an interrupt (IR) and a hardware reset signal (HWR) are cyclically transmitted.

12 Claims, 2 Drawing Sheets

METHOD AND CIRCUIT ARRANGEMENT FOR MONITORING THE OPERATION OF A PROCESSOR

PRIORITY

This application claims foreign priority of the German application DE 10203807.4 filed on Jan. 31, 2002.

BACKGROUND OF THE INVENTION

The invention relates to a method and a circuit arrangement for monitoring the operation of a processor, particularly a hardware watchdog circuit in a motor vehicle.

Patent specification DE 43 29 872 C2 discloses a monitoring circuit for microprocessors, where a monitoring circuit for the processor to be monitored is regularly reset by means of a trigger signal during normal operation. If the processor is in a current saving mode, the monitoring unit sends an interrupt signal to the processor. If the processor does not react to this interrupt signal on account of an error, the monitoring circuit produces a reset pulse.

A known device (DE 32 43 760 C2) for monitoring the operation of a processor comprises a counter with a separate clock oscillator. The counter has a reset input which is reset by a reset signal transmitted by the monitored processor at cyclic intervals of time. If the reset signal is absent, the counter outputs a "graduated reaction" depending on the period of time for which a signal is absent, i.e. initially a signal is transmitted which sets a software interrupt. If this does not result in the program being restarted, a signal triggering a hardware reset on the processor is sent after a pre-set period of time. This restarts the processor, as after the power supply is switched on. If the processor continues to send no reset signal to the counter, the processor is deactivated and/or an alarm is triggered in a third and final stage.

A drawback of the known device is that the processor respectively receives only one request signal to set a software interrupt and to perform a hardware reset. If the processor is not able to perform a restart at this time on account of a temporary disturbance, the system remains inactive and the processor needs to be isolated from the power supply in order to be reinitialized.

Such a temporary disturbance can be triggered by an electromagnetic disturbance signal, for example. When the disturbance has decayed, the processor would restart without any difficulty following a fresh hardware reset signal. In the case of the known device, however, no further hardware reset signal is forthcoming at this point, and the processor remains inactive.

Secondly, the nonmaskable interrupt preferred for the known device does not permit the processor to be operated in a current saving mode. The processor would need to reset the counter before the first, usually brief period of time has elapsed, otherwise the processor would be "woken up" again by the setting of the software interrupt. Consequently, only a minimal current saving is obtained.

SUMMARY OF THE INVENTION

It is an object of the invention to provide a method and a circuit arrangement which monitor a processor and increase the processor's immunity to failure.

This object can be achieved by means a method for monitoring the operation of a processor comprising the following method steps:
- altering a count variable of a counter by a predetermined value by a clock signal which is generated by a clock generator,
- if program execution in the processor is correct, then resetting the count variable to a predetermined start value at intermittent intervals of time by a reset signal from the processor,
- if the count variable reaches a first limit value, then using a first output of the counter to transmit an interrupt signal to an interrupt input of the processor,
- if the count variable reaches a second limit value, then using a second output of the counter to transmit a hardware reset signal to the hardware reset input of the processor, and
- upon or after transmission of the hardware reset signal, resetting the counter whereby the count variable is assigned a predetermined start value.

The count variable can be altered by a predetermined increment or a predetermined decrement per clock signal. The processor may comprise a current saving mode, with the interrupt input being disconnectable.

A circuit arrangement for carrying out a method for monitoring the operation of a processor according to the present invention comprises a processor having at least two inputs, an interrupt input and a hardware reset input, and at least one output, a counter having at least two outputs and a reset input, with the counter being clocked by the clock signal from a clock generator. A first output of the counter is electrically connected to the interrupt input of the processor, a second output of the counter is electrically connected to the hardware reset input of the processor, and the reset input is electrically connected to the output of the processor, as a result of which, if program execution is correct, the counter is reset to a predetermined start value at intermittent intervals of time by a reset signal from the processor. Upon reaching a first limit value, the counter alters the potential at the first output and thus sends an interrupt signal to the processor, which, after the arrival of the interrupt signal, restarts the program or jumps to a prescribed location in the program. Upon reaching a second limit value, the counter alters the potential at the second output and thus sends a hardware reset signal to the processor, which then performs a hardware reset. The circuit arrangement comprises a switching unit which uses a change of potential at the reset input to reset the counter to a predetermined start value, and, while there is no reset signal from the processor, the circuit arrangement thus cyclically sends the interrupt signal and the hardware reset signal to the processor. The second output of the counter is electrically connected to the reset input of the counter.

The second output and a third output of the counter can be connected to the reset input of the counter via a gate which performs a logic function. The processor or at least one electrical connection between an output of the counter and an input of the processor may comprise at least one switching unit for disconnecting the inputs or isolating the electrical connections between counter and processor. At least one low-pass filter can be arranged between at least one output and an input of the processor. The electrical connection between at least one output and the input of the processor may comprise at least one inverter. The counter comprises an integrated oscillator.

To achieve the object of the invention, a counter is used to monitor the microprocessor. On the basis of a clock signal generated by a clock generator, the counter increments a count variable. The value of the count variable is output by the counter in binary form.

During normal operation, the processor transmits a reset signal to the counter at predetermined intervals. The counter then resets the count variable to a predetermined start value.

If the reset signal is absent, the count variable thus reaches a first limit value. The counter then sends an interrupt signal to the processor. If the reset signal continues to be absent and the counter reaches a second limit value, the counter sends a hardware reset signal to the processor. The same hardware reset signal or a signal subsequent to the hardware reset signal is also used to reset the counter and to assign a predetermined start value to the count variable.

These program steps are executed until normal operation of the processor has been restored and the processor transmits at least one reset signal to the counter.

In contrast to the known device, the repeated transmission of the interrupt signal and of the hardware reset signal to the processor makes a plurality of attempts to eliminate the disturbance in the operation of the processor. In the case of a temporary disturbance, the system is restarted when the disturbance has decayed, and it is then operational again. This increases the processor's immunity to failure.

BRIEF DESCRIPTION OF THE DRAWINGS

An exemplary embodiment is explained in more detail below with reference to the schematic drawings, in which.

DETAILED DESCRIPTION OF THE PREFERRED EMBODIMENTS

Figure 1:
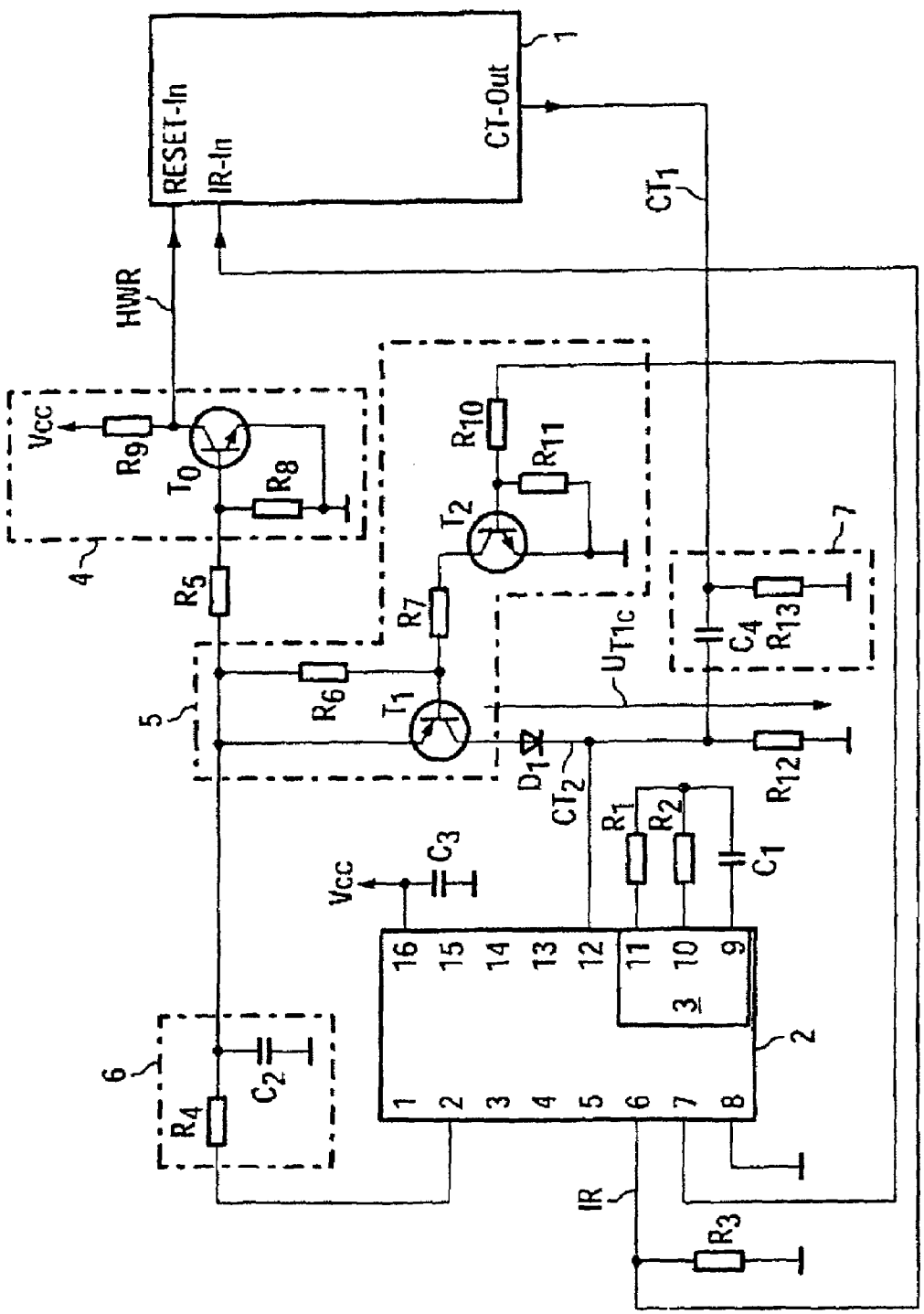
FIG. 1 shows an exemplary embodiment of an inventive circuit arrangement for monitoring the operation of a processor.

An inventive circuit arrangement for monitoring the operation of a processor 1 is shown in FIG. 1. It has a microprocessor 1 to be monitored and a counter 2 with an additional oscillator 3. In this exemplary embodiment, the counter 2 and the oscillator 3 are integrated in one component, e.g. in an MC14060B from the company Motorola. The counter 2 is grounded via connection pin 8 and is connected to the positive pole of the supply voltage via pin 16. In addition, pin 16 is grounded via a suppression capacitor $C_3$.

The clock frequency of the internal oscillator 3 is stipulated by external connection of the oscillator 3 to a capacitor $C_2$ and two resistors $R_1$ and $R_2$. The connection of PINs 9, 10 and 11 on the oscillator 3 to the resistors $R_1=120$ k$\Omega$ and $R_2=56$ k$\Omega$ and to the capacitor $C_1=2$ µF results in a clock signal frequency of 3.88 kHz. This clock signal is used to clock the counter 2.

The counter 2 has a reset input Pin 12 which is connected to an output CT-Out of the processor 1 via a high-pass filter 7 and to an output Pin 2 of the counter 2 via a logic element 5 and a low-pass filter 6. If a program executed on the processor 1 is running correctly, the processor 1 sends a reset signal $CT_1$ to the counter 2 via the output CT-Out at cyclic intervals of time, which resets the counts variable C to a predetermined start value $C_{START}$. The reset input Pin 12 is grounded via a resistor $R_{12}$. In this way, the reset input Pin 12 is assigned a defined potential, and hence unintentional resetting of the counter 2 is prevented.

The counter 2 outputs the value of the count variable C in a binary numerical format at its outputs Pin 1 to Pin 7 and Pin 13 to Pin 15. In this case, Pin 7 represents the "least significant bit" and Pin 3 represents the "most significant bit".

The voltage levels at the outputs are associated with the binary numbers "0" and "1" as follows:
"0" corresponds to the low level: 0 V<U<0.05 V
"1" corresponds to the high level: 4.95 V<U<5 V An output Pin 6 of the counter 2 is connected to an interrupt input IR-In of the processor 1. The output Pin 6 is switched from the low level to the high level as soon as a first limit value is reached. The edge produced at the interrupt input IR-In as a result of the changeover from the low level to the high level is interpreted as an interrupt signal IR by the processor 1. This interrupt signal IR results in the program being restarted or in a jump to a prescribed location in the program. The reaction to the interruption signal IR is dependent on the program.

The interrupt input IR-In of the processor 1 is grounded via a resistor $R_3$. Since this means that there is a low level at the interrupt input IR-In of the processor 1 while the output Pin 6 of the counter 2 is not at a defined level, triggering of an interrupt by an undefined potential at the interrupt input IR-In is prevented.

An output Pin 2 of the counter 2 is connected to a reset input RESET-In of the processor 1 via the resistors R4 and an inverter 4. The inverter 4 comprises a transistor $T_0$ and resistors $R_5$, $R_8$ and $R_9$. In this case too, the reset input RESET-In is assigned a defined potential (depending on the switching state of $T_0$) as a result of the connection to the positive pole of the supply voltage via a resistor $R_9$.

When a second limit value $C_{GR2}$ is reached, the counter 2 changes over the output Pin 2 from the low level to the high level. This means that the high level is applied to the base of the transistor $T_0$, which turns on the transistor $T_0$. The collector of the transistor $T_0$ is now at the low level. The reset input RESET-In of the processor 1 is then at the low level.

Since, in contrast to the interrupt, the hardware reset is not triggered by a switching edge, but rather the low level needs to be applied for a particular period of time, the output Pin 2 and an output Pin 7 of the counter 2 are connected to the reset input Pin 12 of the counter 2 via a gate 5 which performs a logic function.

The gate 5 comprises two transistors $T_1$ and $T_2$ and a plurality of resistors $R_6$, $R_7$, $R_{10}$ and $R_{11}$. The gate 5 performs a logic AND function on the two counter outputs Pin 2 and Pin 7, i.e. when both outputs Pin 2 and Pin 7 are at the high level, the reset input Pin 12 of the counter 2 is set to the high level. As a result, the count variable C is reset to the predetermined start value $C_{START}$, and the second output Pin 2 of the counter 2 is also set to the low level again. This means that the reset input RESET-In of the processor 1 has a signal in inverted form applied to it whose pulse width is determined by the choice of output Pin 7.

Provided that no disturbance prevents it from doing so, the processor 1 then performs a hardware reset, i.e. the processor 1 is reset to the state after the power supply is switched on and restarts.

A diode $D_1$ prevents the reset signal $CT_1$ from the processor 1 from triggering a hardware reset.

In addition, the circuit arrangement shown comprises a low-pass filter 6 in the connection between the output Pin 2 and the reset input RESET-In of the processor 1. This low-pass filter 6, comprising a resistor $R_4$ and a capacitor $C_2$, filters the high-frequency components from the signal edge produced upon changeover from the low level to the high level.

A high-pass filter 7 formed from a capacitor $C_4$ and a resistor $R_{13}$ filters the low-frequency components out of the reset signal $CT_1$ from the processor 1.

Alternatively, the high-pass filter 7 can be replaced by a diode $D_1$ which prevents the reset signal generated by the counter 2 from being transmitted to the processor 1.

Figure 2:
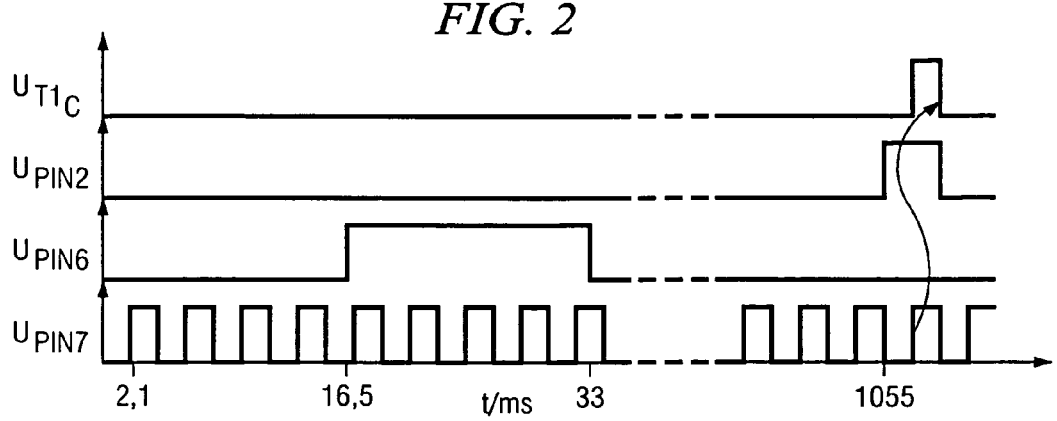
FIG. 2 shows a timing diagram describing the operation of the circuit arrangement from FIG. 1.

FIG. 2 shows a timing diagram which explains the operation of the circuit arrangement described above.

The choice of outputs of the counter 2 determines the period of time after which the respective limit values $C_{gr1}$ and $C_{gr2}$ are reached. In the exemplary embodiment, the first limit value $C_{gr1}$ is reached after 16.5 ms and the output Pin 6 is set to the high level. The voltage $U_{pin6}$ at the output Pin 6 thus has a square-wave pulse duration of 33 ms. The second limit value $C_{gr2}$ is reached after 1055 ms. The voltage $U_{pin2}$ at the output Pin 2 is switched to the high level. The voltage $U_{pin7}$ at the output Pin 7 of the counter 2 has a square-wave pulse duration of 2.1 ms.

As a result of the output Pin 2 and the output Pin 7 being logically ANDed, a reset signal $CT_2$ is produced after (1055+4.2) ms, in this case illustrated as a voltage $U_{T1C}$ on the collector of the transistor $T_1$. The reset signal $CT_2$ resets the count variable C to the start value. A square-wave signal which is inverted by means of the inverter 4 and has a pulse width of 4.2 ms is thus applied to the reset input RESET-In of the processor 1.

Figure 3:
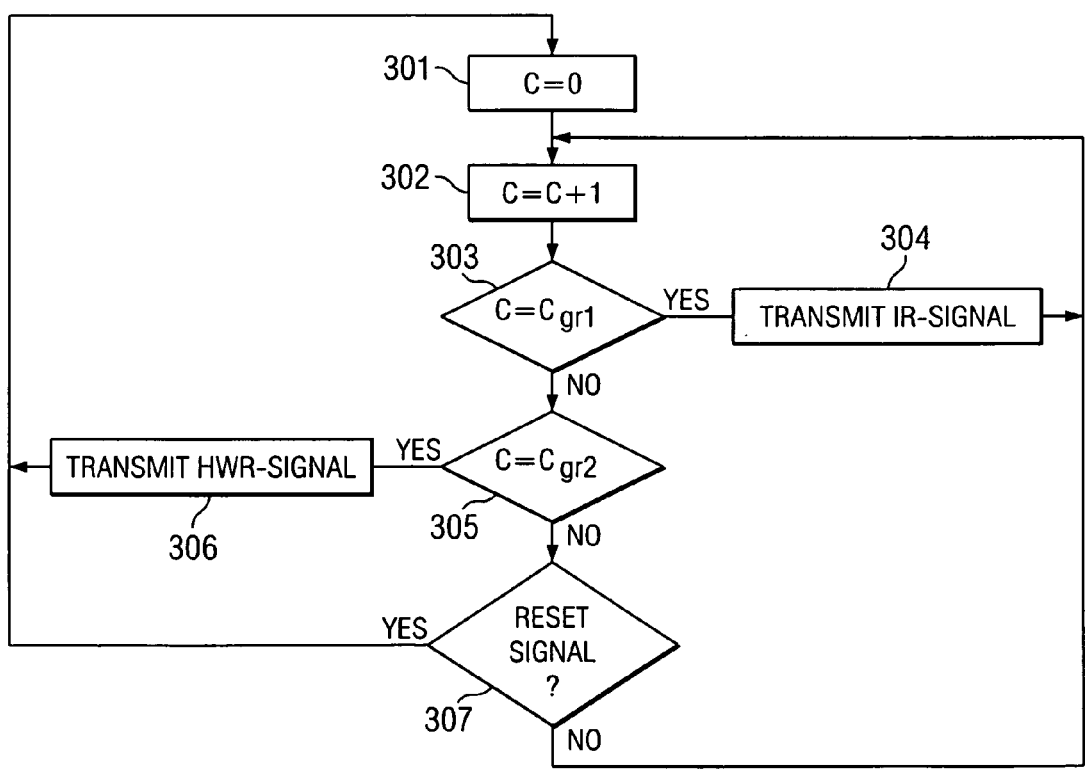
FIG. 3 shows a flowchart showing the steps for monitoring and resetting a processor.

FIG. 3 is used to explain a method for monitoring the operation of a processor 1.

In step 301, the count variable C is assigned the defined start value $C_{START}$, in this case zero, i.e. the counter 2 is reset.

In the next step 302, the value of the count variable C is incremented by a predetermined value, in this case one, for example. The important thing in this step is that the count variable C alters by the predetermined value per clock signal.

In step 303, the count variable C is compared with the first limit value $C_{gr1}$. If its value is not equal to the first limit value $C_{gr1}$, the count variable C is compared with the second limit value $C_{gr2}$ in step 305.

If the result of this comparison is also negative, a check is performed in step 307 to determine whether there is a reset signal $CT_1$ from the processor 1.

If there is no reset signal $CT_1$, the process returns to step 302 and the count variable C is incremented by the predetermined value again.

If the result of the comparison performed in step 303 is positive and the count variable C corresponds to the first limit value $C_{gr1}$, the process branches to step 304 and an interrupt signal IR is transmitted to the processor 1. The process then jumps back to step 302 again.

If the count variable C is equal to the second limit value $C_{gr2}$, the process branches to step 306. At that point, the counter 2 transmits a reset signal HWR to the processor 1 and jumps back to the start of the program (step 301), where the process starts again.

The process steps (301 to 307) are repeatedly executed until the processor 1 sends a reset signal $CT_1$ to the counter 2.

In one possible variant embodiment, the circuit arrangement's power consumption can be reduced by disconnecting the interrupt input IR-In. Disconnection can be effected either by a switching unit in the connection between the output Pin 6 of the counter 2 and the interrupt input IR-In of the processor 1 or by the program ("maskable interrupt") running on the processor 1.

In this way, the processor 1 can be switched to a power saving mode and needs to reset the counter 2 only before the second limit value $C_{gr2}$ is reached, or it is "woken up" by a hardware reset signal HWR from the counter 2 after the second limit value $C_{gr2}$ is reached.

The circuit is used as a hardware watchdog circuit, e.g. for monitoring the operation of a processor 1 in a motor vehicle.

The invention claimed is:

1. A method for monitoring the operation of a processor comprising the following method steps:
   altering a count variable of a counter by a predetermined value by a clock signal which is generated by a clock generator,
   if program execution in the processor is correct, then resetting the count variable to a predetermined start value at intermittent intervals of time by a reset signal from the processor,
   if the count variable reaches a first limit value, then using a first output of the counter to transmit an interrupt signal to an interrupt input of the processor,
   if the count variable reaches a second limit value, then using a second output of the counter to transmit a hardware reset signal to the hardware reset input of the processor, and
   upon transmission of the hardware reset signal, resetting the counter whereby the count variable is assigned a predetermined start value.

2. The method as claimed in claim 1, wherein the count variable is altered by a predetermined increment or a predetermined decrement per clock signal.

3. The method as claimed in claim 1, wherein the processor comprises a current saving mode, with the interrupt input being disconnectable.

4. A method for monitoring the operation of a processor comprising the following method steps:
   altering a count variable of a counter by a predetermined value by a clock signal which is generated by a clock generator,
   if program execution in the processor is correct, then resetting the count variable to a predetermined start value at intermittent intervals of time by a reset signal from the processor,
   if the count variable reaches a first limit value, then using a first output of the counter to transmit an interrupt signal to an interrupt input of the processor,
   if the count variable reaches a second limit value, then using a second output of the counter to transmit a hardware reset signal to the hardware reset input of the processor, and
   after transmission of the hardware reset signal, resetting the counter whereby the count variable is assigned a predetermined start value.

5. The method as claimed in claim 4, wherein the count variable is altered by a predetermined increment or a predetermined decrement per clock signal.

6. The method as claimed in claim 4, wherein the processor comprises a current saving mode, with the interrupt input being disconnectable.

7. A circuit arrangement for carrying out a method for monitoring the operation of a processor, comprising:
   a processor having at least two inputs, an interrupt input and a hardware reset input, and at least one output, a counter having at least two outputs and a reset input, with the counter being clocked by the clock signal from a clock generator, wherein a first output of the counter is electrically connected to the interrupt input of the processor, a second output of the counter is electrically connected to the hardware reset input of the processor, and the reset input is electrically connected to the output of the processor, as a result of which, if program execution is correct, the counter is reset to a predetermined start value at intermittent intervals of time by a reset signal from the processor, wherein, upon reaching a first limit value, the counter alters the potential at the first output and thus sends an interrupt signal to the processor, which, after the arrival of the interrupt signal, restarts the program or jumps to a prescribed location in the program, wherein, upon reaching a second limit value, the counter alters the potential at the second output and thus sends a hardware reset signal to the processor, which then performs a hardware reset, wherein the circuit arrangement comprises a switching unit which uses a change of potential at the reset input to reset the counter to a predetermined start value, and, while there is no reset signal from the processor, the circuit arrangement thus cyclically sends the interrupt signal and the hardware reset signal to the processor, and wherein the second output of the counter is electrically connected to the reset input of the counter.

8. The circuit arrangement as claimed in claim 7, wherein the second output and a third output of the counter are connected to the reset input of the counter via a gate which performs a logic function.

9. The circuit arrangement as claimed in claim 7, wherein the processor or at least one electrical connection between an output of the counter and an input of the processor comprises at least one switching unit for disconnecting the inputs or isolating the electrical connections between counter and processor.

10. The circuit arrangement as claimed in claim 7, wherein at least one low-pass filter is arranged between at least one output and an input of the processor.

11. The circuit arrangement as claimed in claim 7, wherein the electrical connection between at least one output and the input of the processor comprises at least one inverter.

12. The circuit arrangement as claimed in claim 7, wherein the counter comprises an integrated oscillator.

* * * * *